(12) United States Patent
Thiam et al.

(10) Patent No.: US 7,528,780 B2
(45) Date of Patent: *May 5, 2009

(54) STACKED PATCH ANTENNAS

(75) Inventors: Cheikh Thiam, Grand Blanc, MI (US); Andreas Fuchs, Orion, MI (US); Ayman Duzdar, Holly, MI (US); Chun Kit Lai, Grand Blanc, MI (US)

(73) Assignee: Laird Technologies, Inc., Chesterfield, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/860,869

(22) Filed: Sep. 25, 2007

(65) Prior Publication Data

US 2008/0068270 A1   Mar. 20, 2008

Related U.S. Application Data

(63) Continuation of application No. 11/606,333, filed on Nov. 29, 2006, now Pat. No. 7,277,056.

(60) Provisional application No. 60/845,302, filed on Sep. 18, 2006, provisional application No. 60/845,101, filed on Sep. 15, 2006.

(51) Int. Cl.
    *H01Q 1/38* (2006.01)
(52) U.S. Cl. ............................................. 343/700 MS
(58) Field of Classification Search .......... 343/700 MS, 343/853; 455/132, 277.1
    See application file for complete search history.

(56) References Cited

U.S. PATENT DOCUMENTS 4,089,003 A  5/1978  Conroy
4,132,995 A  1/1979  Monser
4,827,271 A  5/1989  Berneking et al.

(Continued)

FOREIGN PATENT DOCUMENTS

DE   101 33 295 A1   1/2003

(Continued)

OTHER PUBLICATIONS

Goving V et al: "Design of multiband baluns on liquid crystalline polymer (LCP) based substrates" Electronic Components and Technology, 2004. ECTC -04. Proceedings Las Vegas, NV, USA Jun. 1-4, 2004, Piscataway, NJ, USA, IEEE, vol. 2, Jun. 1, 2004, pp. 1812-1818, XPO10715244 ISBN: 0-7803-8365-6 *abstract* *figures 1-3* *p. 1812, col. 1, paragraph 2-p. 1816, col. 1, paragraph 2*, 7 pages.

(Continued)

*Primary Examiner*—Tan Ho
(74) *Attorney, Agent, or Firm*—Harness, Dickey & Pierce, P.L.C.

(57) ABSTRACT

According to various exemplary embodiments, an antenna assembly generally includes a first patch antenna and a second patch antenna. The first patch antenna may include a first feed point and be tuned to a first frequency. The second patch antenna may include a second feed point and be tuned to a second frequency. The antenna assembly may further include a low noise amplifier in communication with the first and second feed points of the respective first and second patch antennas for amplifying signals received by the first and second patch antennas.

21 Claims, 3 Drawing Sheets

U.S. PATENT DOCUMENTS

| | | | |
|---|---|---|---|
| 4,873,529 A | 10/1989 | Gibson | |
| 5,121,127 A | 6/1992 | Toriyama | |
| 5,153,600 A | 10/1992 | Metzler | |
| 5,396,658 A | 3/1995 | Hwu et al. | |
| 6,008,770 A | 12/1999 | Sugawara | |
| 6,087,990 A * | 7/2000 | Thill et al. | 343/700 MS |
| 6,181,281 B1 | 1/2001 | Desclos et al. | |
| 6,466,768 B1 | 10/2002 | Agahi-Kesheh et al. | |
| 6,538,609 B2 | 3/2003 | Nguyen et al. | |
| 6,556,169 B1 | 4/2003 | Fukuura et al. | |
| 6,762,729 B2 | 7/2004 | Egashira | |
| 6,806,838 B2 | 10/2004 | Petros et al. | |
| 6,906,669 B2 * | 6/2005 | Sabet et al. | 343/700 MS |
| 6,930,639 B2 | 8/2005 | Bauregger et al. | |
| 7,019,705 B2 | 3/2006 | Pfletschinger et al. | |
| 7,030,824 B1 | 4/2006 | Taft et al. | |
| 7,084,815 B2 | 8/2006 | Phillips et al. | |
| 7,110,381 B1 * | 9/2006 | O'Sullivan et al. | 370/338 |
| 7,116,952 B2 | 10/2006 | Arafa | |
| 7,164,385 B2 | 1/2007 | Duzdar, et al. | |
| 7,245,261 B2 * | 7/2007 | Zafar et al. | 343/713 |
| 7,277,056 B1 * | 10/2007 | Thiam et al. | 343/700 MS |
| 7,295,167 B2 * | 11/2007 | Aminzadeh et al. | 343/713 |
| 2004/0051661 A1 | 3/2004 | Wixforth et al. | |
| 2004/0051675 A1 | 3/2004 | Inoue | |
| 2004/0056803 A1 * | 3/2004 | Soutiaguine et al. | 343/700 MS |
| 2004/0072575 A1 | 4/2004 | Young et al. | |
| 2004/0075610 A1 | 4/2004 | Pan | |
| 2004/0104858 A1 | 6/2004 | Pfletschinger et al. | |
| 2004/0183735 A1 | 9/2004 | Jecko et al. | |
| 2005/0215194 A1 | 9/2005 | Boling et al. | |
| 2006/0097924 A1 | 5/2006 | Yegin et al. | |
| 2006/0103576 A1 | 5/2006 | Mahmoud et al. | |
| 2006/0205369 A1 | 9/2006 | Schaich et al. | |
| 2006/0220970 A1 | 10/2006 | Aminzadeh et al. | |
| 2006/0273969 A1 | 12/2006 | Aminzadeh et al. | |
| 2007/0182626 A1 | 8/2007 | Samavati et al. | |

FOREIGN PATENT DOCUMENTS

| | | |
|---|---|---|
| EP | 0 323 664 A2 | 12/1988 |
| EP | 0 521 384 A1 | 1/1993 |
| EP | 1 249 892 A2 | 10/2002 |
| EP | 1357636 | 10/2003 |
| EP | 1619752 | 1/2006 |
| JP | 63004723 | 9/1988 |
| JP | 2000165135 | 6/2000 |
| WO | WO 01/03235 A1 | 1/2001 |
| WO | WO 02/49151 | 6/2002 |

OTHER PUBLICATIONS

Hossein Hashemi et al: "Concurrent Multiband, Low-NoiseAmplifiers-Theory, Design and Applications" IEEE Transactions on Microwave Theory and Techniques, IEEE Service Center, Piscataway, NJ, US, vol. 50, No. 1, Jan. 2002, XPO11038576 ISSN: 0018-9480 *abstract* *figures 2, 3* *p. 288, col. 1, paragraph 3- col. 2, paragraph 3* *p. 3*, col. 1, paragraph 2—p. 4, col. 1, paragraph 3*, 14 pages.

E.B. Perri, "Dual band cellular antenna in a multifunction platform for vehicular applications", 2006 IEEE Antennas and Propagation Society International Symposium, Albuquerque, NM, USA, Jul. 9-14, 2006 (abstract).

E.B. Perri, "Dual band cellular antenna in a multifunction platform for vehicular applications", 2006 IEEE, University of Sao Paulo—Dept. of Telecommunications and Control Engineering Av. Prof. Luciano Gualberto, trav. 3, 158 ZC 05508-900 Sao Paulo, Brazil (2006) pp. 2361-2364.

S. Maci and G. Biffi Gentili, "Dual-Frequency Patch Antennas," IEEE Antennas and Propagation Magazine, Bd. 39, Nr 6, Dec. 1997, pp. 13-20.

Handbook of Microstrip Antennas, 1989, pp. 318-320.

"Build This No-Tune Dual-Band Feed for Mode L/S", The Armstrong Journal, Jan./Feb. 2002, 7 pages.

European Search Report dated Mar. 9, 2006 in European Application No. EP 05 01 5079.6, 6 pages.

German Patent Office Action dated Jun. 3, 2005 in German Application No. 10 2004 035 064.7-55, filed Jul. 20, 2004, 4 pages.

U.S. Appl. No. 60/724,121, filed Oct. 6, 2005, Samavati.

* cited by examiner

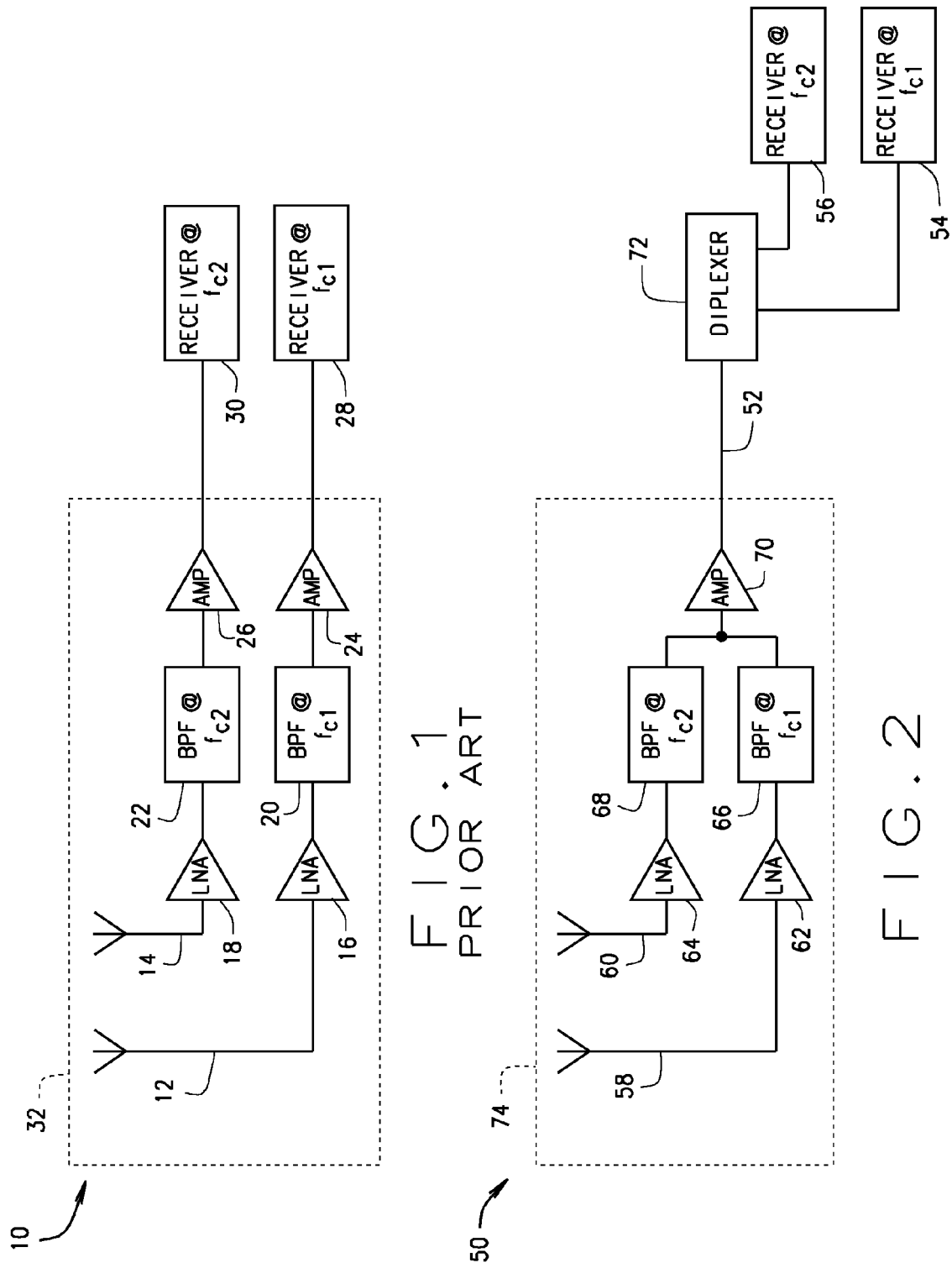

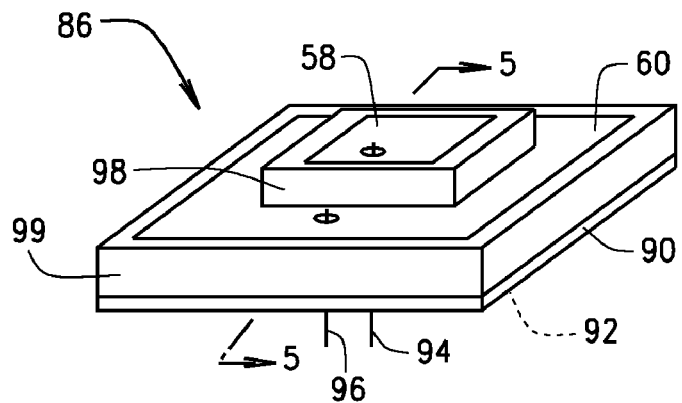
F I G . 4
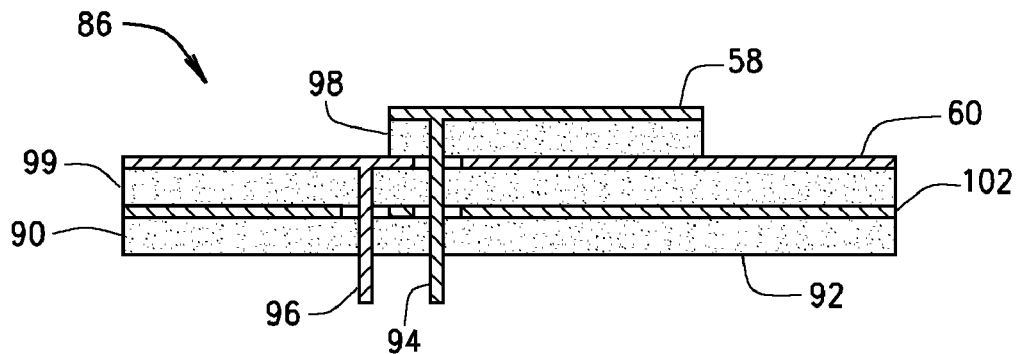
F I G . 5
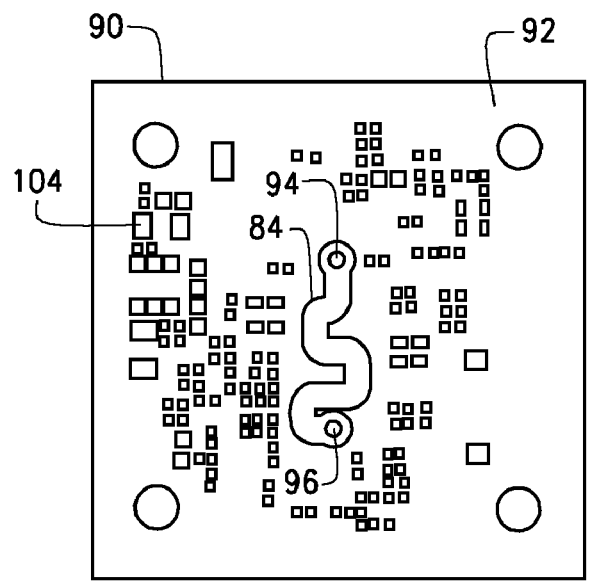
F I G . 6

US 7,528,780 B2

STACKED PATCH ANTENNAS

CROSS-REFERENCE TO RELATED APPLICATIONS

This application is a continuation of presently allowed U.S. patent application Ser. No. 11/606,333 filed Nov. 29, 2006, which, in turn claimed the benefit of U.S. Provisional Application No. 60/845,101 filed Sep. 15, 2006 and U.S. Provisional Application No. 60/845,302 filed Sep. 18, 2006. The disclosures of the above applications are incorporated herein by reference.

FIELD

The present disclosure relates to stacked patch antennas.

BACKGROUND

The statements in this section merely provide background information related to the present disclosure and may not constitute prior art.

Referring now to FIG. 1, a radio receiver system 10 is shown. As shown, system 10 includes a first patch antenna 12 tuned to a first center frequency fc1. System 10 also includes a second patch antenna 14 tuned to a second center frequency fc2. In some embodiments, first center frequency fc1 may be a frequency used by the Satellite Digital Audio Radio Service (SDARS) (e.g., 2.320 GHz to 2.345 GHz in the United States, etc.), and second center frequency fc2 may be a frequency used by the Global Positioning System (GPS) (e.g., at least 1.575 GHz, etc.).

As shown in FIG. 1, a first low noise amplifier (LNA) 16 amplifies the signal from first patch antenna 12. A second LNA 18 amplifies the signal from second patch antenna 14. Signals from first LNA 16 and second LNA 18 communicate with inputs of respective band pass filters 20, 22 that have center frequencies at fc1 and fc2, respectively. A first amplifier 24 amplifies the signal from an output of first band pass filter 20. A second amplifier 26 amplifies the signal from an output of second band pass filter 22.

A first radio receiver 28 receives the signal from first amplifier 24. In some embodiments, first radio receiver 28 may be an SDARS receiver that is compatible with SIRIUS satellite radio and/or XM satellite radio broadcast signals. A second radio receiver 30 receives the signal from second amplifier 26. In some embodiments, second radio receiver 30 may be a GPS receiver that includes a display and/or user interface.

First patch antenna 12, second patch antenna 14, first LNA 16, second LNA 18, first band pass filter 20, second band pass filter 22, first amplifier 24, and second amplifier 26 may be assembled into a compact antenna assembly 32. Antenna assembly 32 may be suitable for mounting on a structure, such as a motor vehicle roof.

Coaxial cables may be used for making the connections between first amplifier 24 and first radio receiver 28 and between second amplifier 26 and second radio receiver 30. First LNA 16, second LNA 18, and coaxial cables tend to be fairly expensive when compared to the costs associated with the other elements of the antenna assembly 32.

SUMMARY

According to various exemplary embodiments, an antenna assembly generally includes a first patch antenna and a second patch antenna. The first patch antenna may include a first feed point and be tuned to a first frequency. The second patch antenna may include a second feed point and be tuned to a second frequency. The antenna assembly may further include a low noise amplifier in communication with the first and second feed points of the respective first and second patch antennas for amplifying signals received by the first and second patch antennas.

Other exemplary embodiments include methods relating to operation of antenna assemblies having first and second patch antennas. The first patch antenna may include a first feed point and be tuned to a first frequency. The second patch antenna may include a second feed point and be tuned to a second frequency. A method may include inputting a signal output for signals received by the first and second patch antennas to a low noise amplifier for amplification.

In another exemplary embodiment, an antenna assembly generally includes first and second patch antennas. The first patch antenna may include a first feed point. The first patch antenna may be tuned to a first frequency associated with a satellite digital radio service. The second patch antenna may include a second feed point. The second patch antenna may be tuned to a second frequency associated with a global positioning system. The antenna assembly may further include a single low noise amplifier shared by the first and second patch antennas. The low noise amplifier may be communication with the first and second patch antennas for amplifying signals received by the first and second patch antennas.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 1 is a functional block diagram of a dual-frequency radio receiver system in accordance with the prior art;

FIG. 2 is a functional block diagram of a radio receiver system according to an exemplary embodiment;

FIG. 4 is a perspective view of stacked patch antennas that are included in the radio receiver system shown in FIG. 3;

FIG. 5 is a cross section of the stacked patch antennas shown in FIG. 4; and

FIG. 6 is a plan view of a printed circuit board that is positioned on the stacked patch antennas shown in FIG. 4.

DETAILED DESCRIPTION

Figure 3:
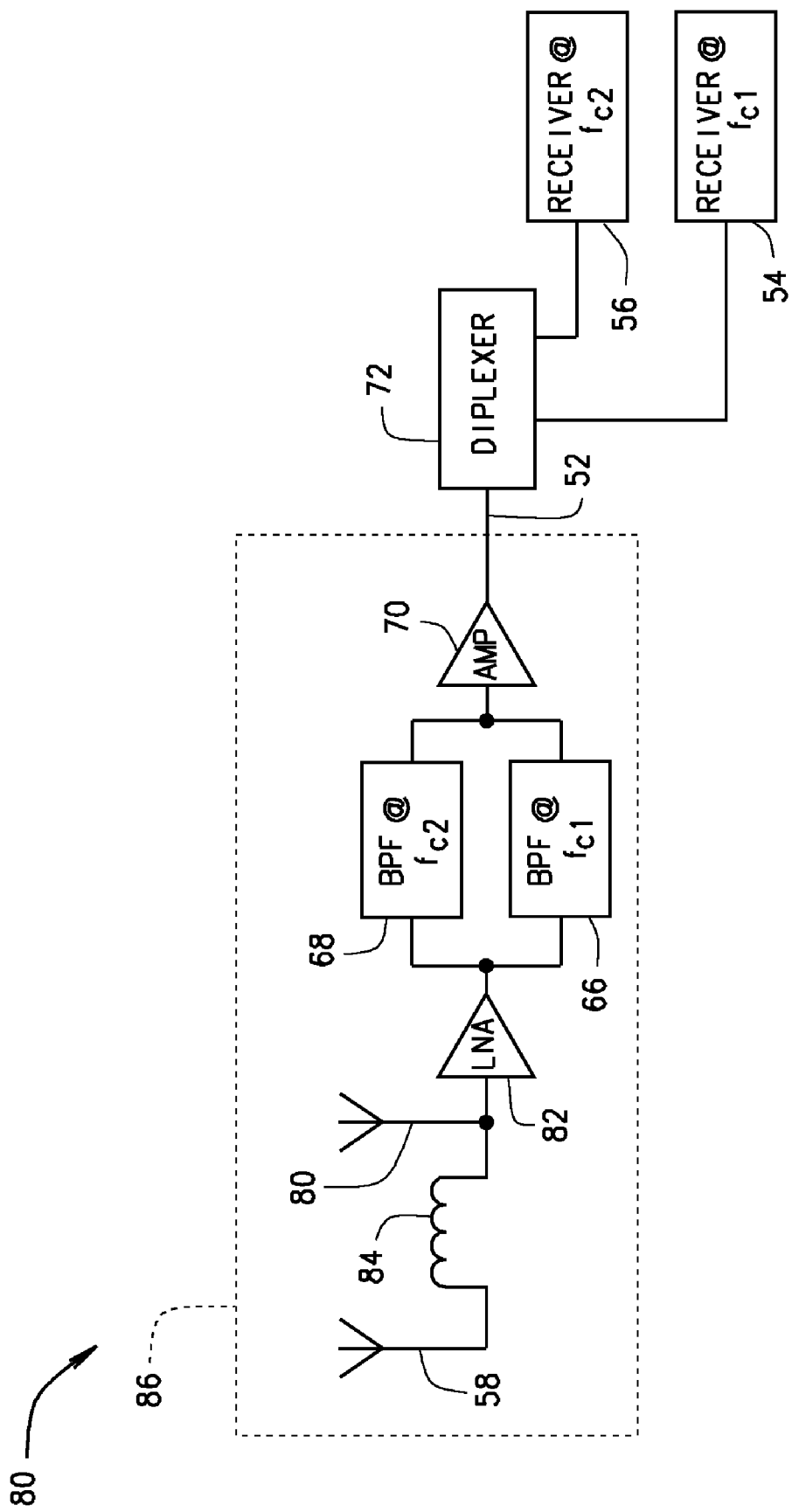
FIG. 3 is a functional block diagram of another exemplary embodiment of a radio receiver system.

The following description is merely exemplary in nature and is not intended to limit the present disclosure, application, or uses. It should be understood that throughout the drawings, corresponding reference numerals indicate like or corresponding parts and features.

FIG. 2 illustrates an exemplary radio receiver system 50 embodying one or more aspects of the present disclosure. As shown, system 50 employs an architecture that allows a single coaxial cable 52 (or other suitable communication line) to communicate an output signal from an amplifier 70 to a splitter or diplexer 72, which then divides the output signal into respective first for a first radio receiver 54 and a second radio receiver 56. The first and second signals have center frequencies at fc1 and fc2, respectively. In some embodiments, first radio receiver 54 may be a SDARS receiver that is compatible with SIRIUS satellite radio and/or XM satellite radio broadcast signals. In some embodiments, second radio receiver 56 may be a GPS receiver that includes a display and/or user interface.

System 50 includes a first patch antenna 58 tuned to first center frequency fc1. System 50 also includes a second patch antenna 60 tuned to second center frequency fc2. In some embodiments, fc1 may be a frequency used by the Global Positioning System (GPS) (e.g., and fc2 may be a frequency used by the Satellite Digital Audio Radio Service (SDARS). Alternatively, either or both patch antennas 58 and/or 60 may be configured for receiving other signals besides GPS and SDARS, respectively, and/or be tuned for higher or lower frequency bands, for example, by adjusting the dimensions of the antenna structures. Additionally, or alternatively, the range of frequency bands may be selected for the first and/or the second patch antennas 58, 60 by changing the dielectric material(s) of the substrate(s) accordingly to achieve certain frequency band(s).

Second patch antenna 60 may be stacked on top of first patch antenna 58 in the exemplary manner disclosed in German patent application No. 10 2004 035 064.7 filed Jul. 20, 2004 and/or in U.S. patent application Ser. No. 11/185,015 filed Jul. 20, 2005, the disclosures of which are both incorporated herein by reference in their entirety.

A first low noise amplifier (LNA) 62 amplifies the signal from first patch antenna 58. A second LNA 64 amplifies the signal from second patch antenna 60. Signals from first and second LNAs 62 and 64 pass through respective band pass filters 66, 68 that have center frequencies at fc1 and fc2, respectively. Output signals from first and second band pass filters 66, 68 are combined and applied to an input of an amplifier 70.

A splitter or diplexer 72 receives the signal from amplifier 70 and divides the signal into a first signal that is centered at fc1 and a second signal that is centered at fc2. First receiver 54 receives the first signal. Second radio receiver 56 receives the second signal.

First patch antenna 58, second patch antenna 60, first LNA 62, second LNA 64, first band pass filter 66, second band pass filter 68, and amplifier 70 may be assembled into a compact antenna assembly 74. This compact antenna assembly 74 may be adapted for mounting on a structure, such as a motor vehicle roof.

Referring now to FIG. 3, a second embodiment of a radio receiver system 80 is shown. System 80 employs an architecture that allows a single LNA 82 to amplify the signal from first patch antenna 58 and to amplify the signal from second patch antenna 60. System 80 also employs a single coaxial cable 52 to communicate the signal from amplifier 70 to diplexer 72. First patch antenna 58 can be stacked on top of the second patch antenna 60 in the exemplary manner disclosed in German patent application No. 10 2004 035 064.7 filed Jul. 20, 2004 and/or in U.S. patent application Ser. No. 11/185,015 filed Jul. 20, 2005, the disclosures of which are both incorporated herein by reference in their entirety.

A transmission line 84 connects between a feed point of first patch antenna 58 and a feed point of second patch antenna 60. Transmission line 84 may be formed as a trace on a printed circuit board (PCB) 90 as shown in FIG. 6. Alternative communication links and/or means for providing a signal output for signals received by the first and second patch antennas may also be employed in other embodiments. Transmission line 84 is discussed in more detail below.

LNA 82 amplifies the signal from second patch antenna 60. LNA 82 also amplifies the signal from first patch antenna 58. Transmission line 84 communicates the signal from first patch antenna 58 to the input of LNA 82. An output of LNA 82 communicates with the input of first band pass filter 66 and the input of the second band pass filter 68. The outputs of first and second band pass filters 66 and 68 are coupled and communicate with the input of amplifier 70.

The output of amplifier 70 communicates with the input of diplexer 72. Diplexer 72 receives a signal from the output of amplifier 70 and divides that signal into a first signal centered at fc1 and a second signal centered at fc2. First receiver 54 receives the first signal. Second radio receiver 56 receives the second signal.

First patch antenna 58, second patch antenna 60, LNA 82, band pass filters 66, 68, and amplifier 70 may be assembled into a compact antenna assembly 86. This compact antenna assembly 86 may be suitable for mounting on a structure, such as a motor vehicle roof.

Transmission line 84 will now be described in more detail. In order for the stacked combination of first patch antenna 58 and second patch antenna 60 to function properly, any interference between the two patch antennas should preferably be minimized or at least reduced. Reducing the interference between first patch antenna 58 and second patch antenna 60 may be equivalent to increasing the isolation between them.

In the following example, fc1 is an SDARS frequency between 2320 MHz to 2345 MHz, and fc2 is a GPS frequency of 1575 MHz. One exemplary way of increasing the isolation provided by transmission line 84 is to make sure that the impedance from first patch antenna 58 is high at the GPS frequency, and also that the impedance of first patch antenna 58 (as seen by second patch antenna 60) remains high at the SDARS frequency. This can be achieved using transmission line 84 with a characteristic impedance of fifty ohms between first patch antenna 58 and second patch antenna 60. In some embodiments, transmission line 84 is one-quarter wavelength at the GPS frequency.

In a lossless and homogenous dielectric medium characterized with its permittivity $\epsilon_r$ and permeability $\mu$, the effect of transmission line 84 can be analyzed with the following equations:

$$Z_{in} = \frac{z_{load} + jtg\beta l}{1 + jz_{load}tg\beta l} \quad \text{(Equation 1)}$$

$$\beta = 2\pi/\lambda \text{ and} \quad \text{(Equation 2)}$$

$$\lambda = \frac{C}{f\sqrt{\epsilon_r}} \quad \text{(Equation 3)}$$

wherein:
C=speed of light,
f=frequency,
$\epsilon_r$=relative permittivity of the medium,
$Z_{in}$=impedance transformed at the input (transformed impedance),
$z_{load}$=impedance at the opposite side of the input (load impedance), and
$\lambda$=wavelength.

If a length l of transmission line 84 is $\lambda/4$ at the GPS frequency, then the low impedance of first patch antenna 58 is transformed into a high impedance as shown below by Equation 4.

$$Z_{in} \approx jtg\beta l \approx jtg(\pi/2) = \infty \quad \text{(Equation 4)}$$

At the SDARS frequency, the length l of transmission line 84 is 1.47*$\lambda$ (approximately 1.5*$\lambda$). Since second patch antenna 60 has high impedance, first patch antenna 58 sees from second patch antenna 60 the following impedance:

$$Z_{in} \approx jtg\beta l \approx jtg(\pi/2) = \infty \quad \text{(Equation 5)}$$

Transmission line 84 therefore provides satisfactory isolation between first patch antenna 58 and second patch antenna 60.

In some embodiments, the transmission line 84 comprises a one-quarter wavelength transformer (at the GPS frequency) operable as a radio frequency choke for isolating the outputs or signals from the first patch antenna 58 from the different outputs or signals from the second antenna 60. For example, some embodiments may have the transmission line 84 isolating SDARS signals received by the first antenna 58 from GPS signals received by the second antenna 60. As noted herein, however, either or both patch antennas 58 and/or 60 may be configured for receiving other signals besides SDARS and GPS, respectively and/or be tuned for higher or lower frequency bands, for example, by adjusting their respective dielectric constants and/or dimensions of their respective antenna structures. In some embodiments, each patch antenna 58 and 60 includes one-half wavelength ($\lambda/2$) antenna structure provided on an upper surface of the lower substrate for reception of satellite transmitted frequencies in the GHz range.

Referring now to FIG. 4, a perspective view is shown of antenna assembly 86. First patch antenna 58 is shown positioned on second patch antenna 60. Second patch antenna 60 is positioned on the PCB 90. A component side 92 of PCB 90 includes circuit traces and pads to accommodate components of LNA 82, band pass filters 66 and 68, amplifier 70, and transmission line 84. A first lead 94 provides a connection to the feed point of first patch antenna 58. A second lead 96 provides a connection to the feed point of second patch antenna 60. First patch antenna 58 includes a first dielectric layer 98. In some embodiments, the dielectric constant of first dielectric layer 98 is about twenty. Second patch antenna 60 includes a second dielectric layer 99. In some embodiments, the dielectric constant of second dielectric layer 99 may be between about two and four, inclusive. In these embodiments, the dielectric constant of first dielectric layer 98 is generally greater than the dielectric constant of second dielectric layer 99. This relationship generally assures that second patch antenna 60 will have sufficient surface area to accommodate first patch antenna 58.

Referring now to FIG. 5, antenna assembly 86 is shown in cross section along section line 5-5 of FIG. 4. Second patch antenna 60 provides a metallization layer for first patch antenna 58. A second metallization layer 102 is provided for second patch antenna 60. The second metallization layer 102 is layered between PCB 90 and second dielectric layer 99.

Referring now to FIG. 6, component side 92 of PCB 90 is shown. In this illustrated embodiment, transmission line 84 may be formed as a meandering circuit trace on PCB 90. Component side 92 also includes a number of pads and traces 104 that accommodate and connect the components of LNA 82, first band pass filter 66, second band pass filter 68, and amplifier 70.

It should be noted that embodiments and aspects of the present disclosure may be used in a wide range of antenna applications, such as patch antennas, telematics antennas, antennas configured for receiving satellite signals (e.g., Satellite Digital Audio Radio Services (SDARS), Global Positioning System (GPS), cellular signals, etc.), terrestrial signals, antennas configured for receiving RF energy or radio transmissions (e.g., AM/FM radio signals, etc.), combinations thereof, among other applications in which wireless signals are communicated between antennas. Accordingly, the scope of the present disclosure should not be limited to only one specific form/type of antenna assembly.

In addition, various antenna assemblies and components disclosed herein may be mounted to a wide range of supporting structures, including stationary platforms and mobile platforms. For example, an antenna assembly disclosed herein could be mounted to supporting structure of a bus, train, aircraft, among other mobile platforms. Accordingly, the specific references to motor vehicles herein should not be construed as limiting the scope of the present disclosure to any specific type of supporting structure or environment.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

The description of the disclosure is merely exemplary in nature and, thus, variations that do not depart from the gist of the disclosure are intended to be within the scope of the disclosure. Such variations are not to be regarded as a departure from the spirit and scope of the disclosure.

What is claimed is:

1. An antenna assembly comprising:
   a first patch antenna including a first feed point, the first patch antenna tuned to a first frequency;
   a second patch antenna including a second feed point, the second patch antenna tuned to a second frequency;
   a low noise amplifier in communication with the first and second feed points of the respective first and second patch antennas for amplifying signals received by the first and second patch antennas;
   an electrical circuit in communication with the first and second feed points of the respective first and second patch antennas, the electrical circuit operable for providing a signal output for signals received by the first and second patch antennas, and wherein the low noise amplifier receives a signal from the signal output of the electrical circuit.

2. The antenna assembly of claim 1, wherein the first frequency is associated with a satellite digital radio service, and wherein the second frequency is associated with a global positioning system.

3. The antenna assembly of claim 1, wherein the antenna assembly includes only one said low noise amplifier that is shared by the first and second patch antennas.

4. The antenna assembly of claim 1, further comprising first and second band pass filters that receive a signal from an output of the low noise amplifier.

5. An antenna assembly comprising:
a first patch antenna including a first feed point, the first patch antenna tuned to a first frequency;
a second patch antenna including a second feed point, the second patch antenna tuned to a second frequency;
a low noise amplifier in communication with the first and second feed points of the respective first and second patch antennas for amplifying signals received by the first and second patch antennas;
means for providing a signal output for signals received by the first and second patch antennas, and wherein the low noise amplifier receives a signal from the signal output.

6. An antenna assembly comprising:
a first patch antenna including a first feed point, the first patch antenna tuned to a first frequency;
a second patch antenna including a second feed point, the second patch antenna tuned to a second frequency;
a low noise amplifier in communication with the first and second feed points of the respective first and second patch antennas for amplifying signals received by the first and second patch antennas;
a transmission line in communication with the first and second feed points of the respective first and second patch antennas, the transmission line providing a signal output for signals received by the first and second patch antennas, and wherein the low noise amplifier receives a signal from the signal output.

7. The antenna assembly of claim 6, wherein the transmission line is formed on a printed circuit board.

8. The antenna assembly of claim 7, wherein the transmission line comprises a circuit board trace.

9. The antenna assembly of claim 8, wherein the circuit board trace includes a meandering pattern.

10. The antenna assembly of claim 6, wherein the transmission line comprises a one-quarter wavelength transformer at a frequency associated with a global positioning system.

11. The antenna assembly of claim 6, wherein the transmission line has a characteristic impedance of fifty ohms between the first patch antenna and second patch antenna.

12. The antenna assembly of claim 6, wherein a length of the transmission line is one-quarter wavelength at a frequency associated with global positioning system, and wherein the length of the transmission line is about one and one-half wavelength at a frequency associated with a satellite digital radio service.

13. An antenna assembly comprising:
a first patch antenna including a first feed roint. the first patch antenna tuned to a first frequency;
a second patch antenna including a second feed point, the second patch antenna tuned to a second frequency;
a low noise amplifier in communication with the first and second feed points of the respective first and second patch antennas for amplifying signals received by the first and second patch antennas;
first and second band pass filters that receive a signal from an output of the low noise amplifier; and
an amplifier that receives a signal from an output of the first band pass filter and receives a signal from the output of the second band pass filter, and wherein the amplifier generates an output signal of the antenna assembly.

14. The antenna assembly of claim 13, wherein the antenna assembly includes only one said amplifier.

15. The antenna assembly of claim 13 wherein the amplifier is configured for communication with a diplexer that receives and divides the output signal from the amplifier into a first signal centered at the first frequency for a first radio receiver, and a second signal centered at the second frequency for a second radio receiver.

16. The antenna assembly of claim 15, further comprising a single communication link for communicating the output signal from the amplifier to a diplexer.

17. The antenna assembly of claim 16, wherein the single communication link comprises a single coaxial cable.

18. A method relating to operation of an antenna system including first and second patch antennas, the first patch antenna including a first feed point and being tuned to a first frequency, the second patch antenna including a second feed point and being tuned to a second frequency, the method comprising inputting a signal output for signals received by the first and second patch antennas to a low noise amplifier for amplification, wherein inputting a signal output includes using a transmission line having a first end in communication with the first feed point and a second end in communication with the second feed point, one of the first and second ends of the transmission line providing the signal output.

19. A method relating to operation of an antenna system including first and second patch antennas, the first patch antenna including a first feed point and being tuned to a first frequency, the second patch antenna including a second feed point and being tuned to a second frequency, the method comprising inputting a signal output for signals received by the first and second patch antennas to a low noise amplifier for amplification, wherein inputting a signal output includes using an electrical circuit in communication with the first and second feed points of the respective first and second patch antennas, the electrical circuit providing the signal output.

20. A method relating to operation of an antenna system including first and second patch antennas, the first patch antenna including a first feed point and being tuned to a first frequency, the second patch antenna including a second feed point and being tuned to a second frequency, the method comprising:
inputting a signal output for signals received by the first and second patch antennas to a low noise amplifier for amplification;
outputting a signal from the low noise amplifier to first and second band pass filters;
inputting signals from the first and second band pass filters to an amplifier, the amplifier generating an output signal of the antenna assembly; and
dividing the output signal from the amplifier into a first signal centered at the first frequency for a first radio receiver, and a second signal centered at the second frequency for a second radio receiver.

21. An antenna assembly comprising:
a first patch antenna including a first feed point, the first patch antenna tuned to a first frequency associated with a satellite digital radio service;
a second patch antenna including a second feed point, the second patch antenna tuned to a second frequency associated with a global positioning system;
a single low noise amplifier in communication with and shared by the first and second patch antennas for amplifying signals received by the first and second patch antennas; and
a feed in communication with the first and second feed points of the respective first and second patch antennas, the feed providing a signal output for signals received by the first and second patch antennas, and wherein the low noise amplifier receives a signal from the signal output.

* * * * *

UNITED STATES PATENT AND TRADEMARK OFFICE
CERTIFICATE OF CORRECTION

| | | |
|---|---|---|
| PATENT NO. | : 7,528,780 B2 | Page 1 of 1 |
| APPLICATION NO. | : 11/860869 | |
| DATED | : May 5, 2009 | |
| INVENTOR(S) | : Thiam et al. | |

It is certified that error appears in the above-identified patent and that said Letters Patent is hereby corrected as shown below:

Col. 7 Line 48 CLAIM 13: Replace "roint." with "point,"

Signed and Sealed this

Fourteenth Day of July, 2009

JOHN DOLL
*Acting Director of the United States Patent and Trademark Office*